United States Patent [19]
Rosen

[11] Patent Number: 5,850,997
[45] Date of Patent: *Dec. 22, 1998

[54] ARTICULABLE PROJECTING PLUG

[75] Inventor: John B. Rosen, Eugene, Oreg.

[73] Assignee: Rosen Product Development, Inc., Eugene, Oreg.

[ * ] Notice: The term of this patent shall not extend beyond the expiration date of Pat. No. 5,611,513.

[21] Appl. No.: 799,617

[22] Filed: Feb. 12, 1997

Related U.S. Application Data

[63] Continuation of Ser. No. 636,172, Apr. 22, 1996, Pat. No. 5,611,513, which is a continuation of Ser. No. 173,799, Dec. 20, 1993, abandoned, which is a continuation-in-part of Ser. No. 829,728, Jan. 31, 1992, Pat. No. 5,271,590.

[51] Int. Cl.⁶ .................................................. F16B 17/00
[52] U.S. Cl. .................................. 248/222.11; 248/278.1; 248/917; 297/188.18; 439/13
[58] Field of Search .......................... 248/221.11, 222.11, 248/222.13, 276.1, 278.1, 917, 919, 920, 921, 922, 923; 297/145, 188.14, 188.15, 188.18, 188.2, 188.21; 439/11, 13, 324, 327

[56] References Cited

U.S. PATENT DOCUMENTS

| | | | |
|---|---|---|---|
| 2,514,655 | 7/1950 | Luketa | 297/145 X |
| 2,739,292 | 3/1956 | Modrey et al. | 439/324 |
| 3,046,513 | 7/1962 | Crowley | 439/347 |
| 3,072,374 | 1/1963 | Bodian | 248/278.1 |
| 4,438,458 | 3/1984 | Münscher . | |
| 4,455,008 | 6/1984 | MacKew | 297/194 X |
| 4,620,808 | 11/1986 | Kurtin et al. | 248/921 X |
| 4,633,323 | 12/1986 | Haberkern et al. . | |
| 4,647,980 | 3/1987 | Steventon et al. . | |
| 4,708,312 | 11/1987 | Rohr | 248/921 X |
| 4,735,467 | 4/1988 | Wolters . | |
| 4,749,364 | 6/1988 | Arney et al. . | |
| 4,836,486 | 6/1989 | Vossoughi et al. | 248/278.1 X |
| 4,982,996 | 1/1991 | Vottero-Fin et al. | 297/194 |
| 5,076,524 | 12/1991 | Reh et al. | 297/194 X |
| 5,144,290 | 9/1992 | Honda et al. | 248/917 X |
| 5,177,616 | 1/1993 | Riday | 248/917 X |
| 5,179,447 | 1/1993 | Lain | 248/917 X |
| 5,195,709 | 3/1993 | Yasushi | 297/188.14 X |

*Primary Examiner*—Derek J. Berger
*Attorney, Agent, or Firm*—Kolisch, Hartwell, Dickinsin, McCormack & Heuser

[57] ABSTRACT

An articulable projecting plug is disclosed that provides for interchangeable mechanical connection between one of several electronic-signal ports such as video-signal ports, and housing/support structure associated with an electronic device such as a flat-screen television. The plug also accommodates video communication between a video-signal source and such television. The plug includes joining structure constructed to bring the plug into contact with the port and hold them both in such joined relationship. The joining structure includes an outer surface and holder structure for holding the first end of an elongate conductor so that joinder of the plug with the port will also result in contact between such first end and the port. The plug also includes an elongate projecting member terminating with first and second ends, with the first end being operatively connected to the joining structure so that the projecting elongate member extends from it and away from the port. A pivot is provided so that the projecting member is articulable in a pivot plane. The projecting member also includes a connector located adjacent its second end for fastening to such housing/support structure of the electronic device.

13 Claims, 3 Drawing Sheets

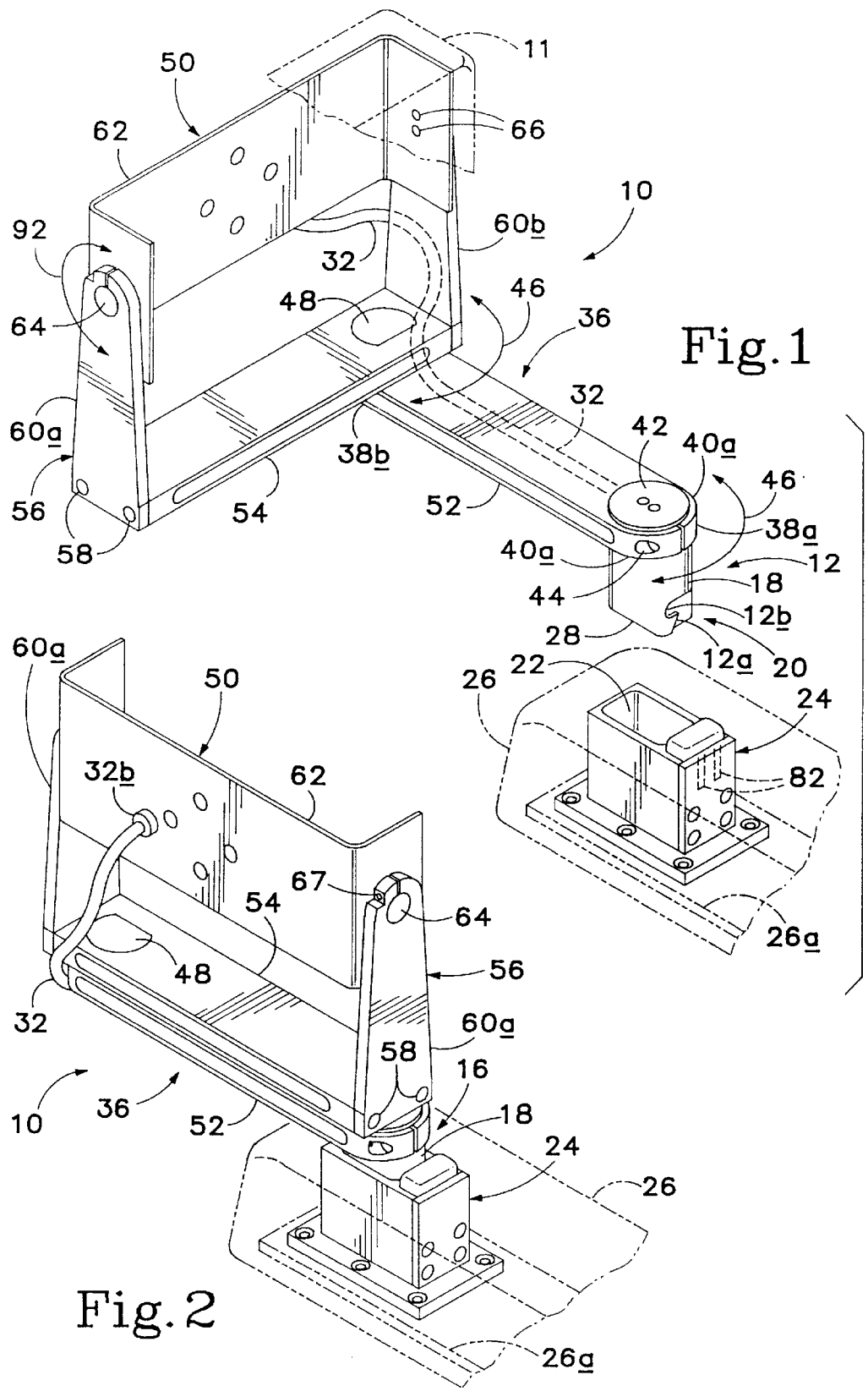

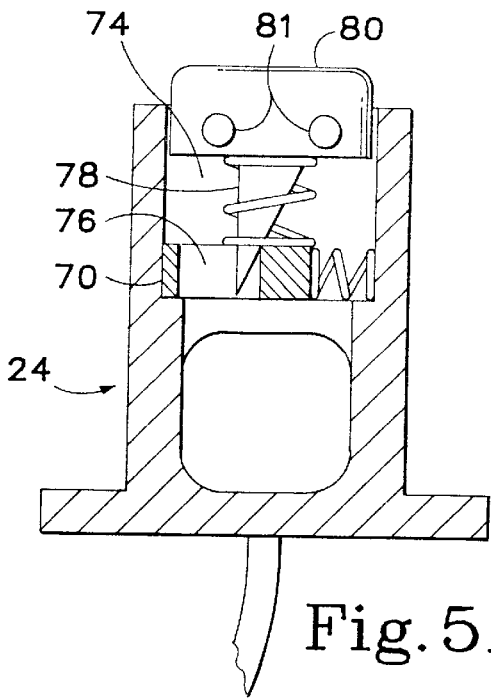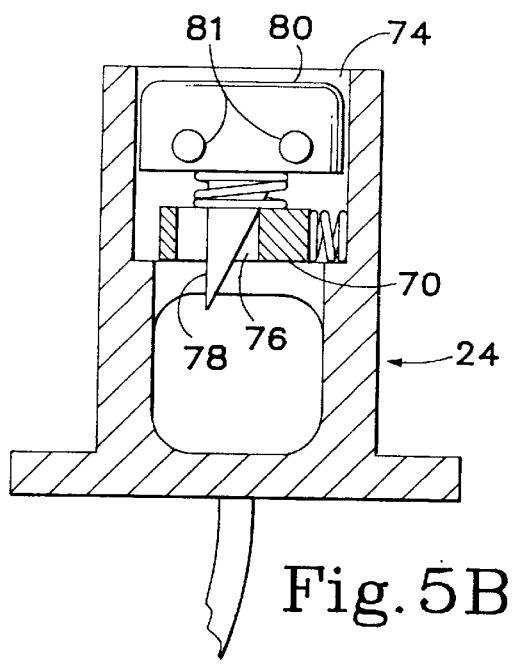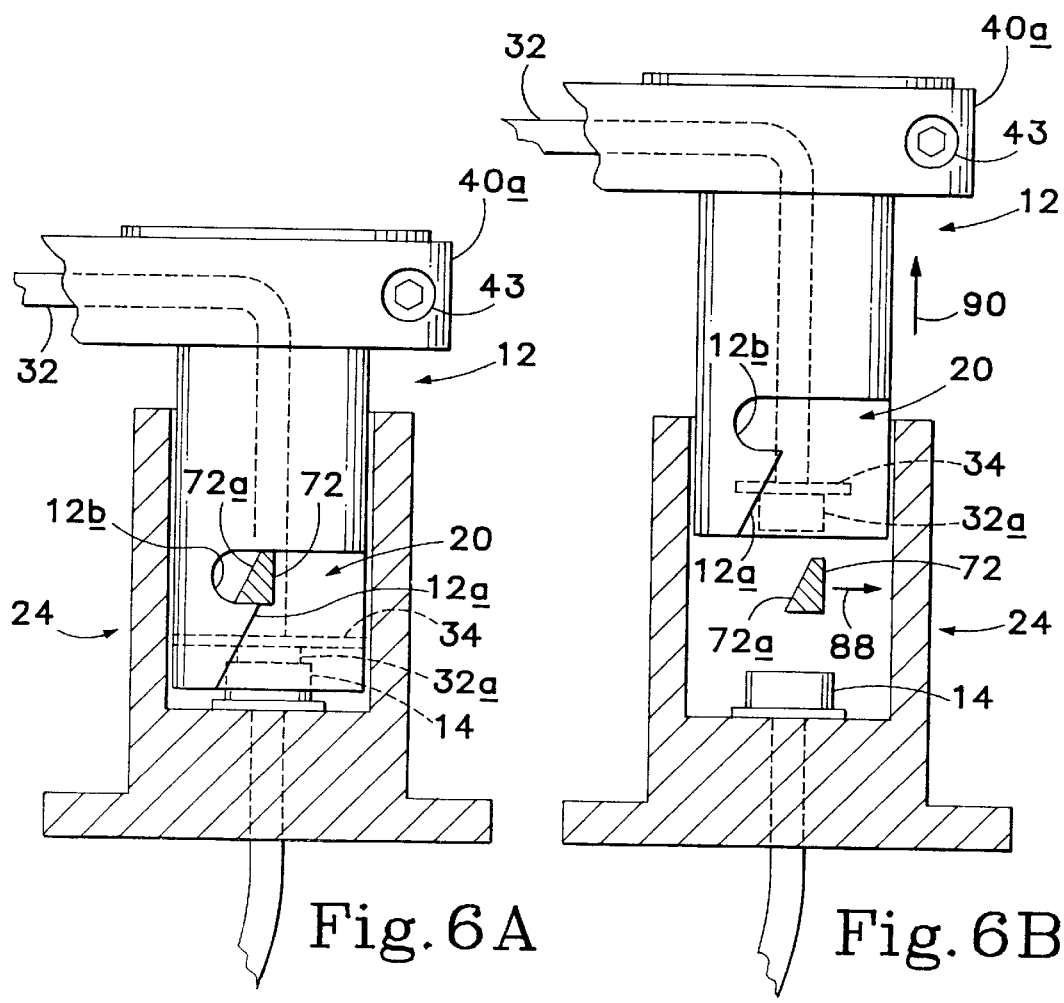

ARTICULABLE PROJECTING PLUG

CROSS REFERENCE TO RELATED APPLICATIONS

This is a continuation of application Ser. No. 08/636,172 filed Apr. 22, 1996 for an ARTICULABLE PROJECTING PLUG, now U.S. Pat. No. 5,611,513, which is a file wrapper continuation of application Ser. No. 08/173,799 filed Dec. 20, 1993, now abandoned, for an ARTICULABLE PROJECTING PLUG, which is a continuation in part of Ser. No. 829,728, filed on Jan. 31, 1992, now U.S. Pat. No. 5,271,590, which issued on Dec. 21, 1993 for an ARTICULABLE PROJECTING PLUG.

BACKGROUND OF THE INVENTION

The present invention relates generally to electronic/mechanical connections between an electronic device and an electronic-signal source, and more particularly to an articulable projecting plug for making such connections between such a device and source.

It is desirable for the user of an electronic device that includes a monitor to be able to position selectively the monitor for comfortable viewing angles. Such electronic device may be any of various devices including televisions or computer monitors. When using such a device, the user is normally sitting in a room or some other type of enclosure or compartment. For example, other enclosures may include the cockpit or passenger area of an airplane.

Conventional televisions and computer monitors are usually positioned in preset positions relative to the viewer. Certain conventional systems include a stand on which to place the monitor/television. For the remainder of this description, monitor/television will be referred to simply as a monitor, and it should be understood that by monitor applicant refers to any type of device for displaying audio/visual or visual information to a viewer.

Prior art proposals involving stands for the monitor provide for a certain amount of adjustability including a swivel mechanism or a tilt feature. However, the stand-based systems are designed for use in relatively stationary settings where there is room to place the monitor on a stand, with the stand usually being placed on a desk or table.

For applications where it is impractical or impossible to use a stand and desk/table, the prior art is lacking a device whereby the monitor may be supported and selectively movable to positions providing improved viewing for individual viewers. There is an increasing need for such a capability because of the greater awareness and focus on ergonomics, which is also known as human engineering or human-factors engineering. Essentially, ergonomics is an applied science that coordinates the design of devices and physical working/use conditions with the capacities and requirements of the user.

Focusing on the aforementioned aircraft setting, the physical conditions of the passenger area do not provide a lot of room for movement by the passenger, or for auxiliary furniture such as desks, tables and other platforms. Similarly, pilots and other airline-support personnel occupy work areas such as the cockpit which present spaces which are equally, if not more, cramped with minimal room for performing their duties.

In the aircraft setting, such monitors are used by pilots and support personnel in the cockpit and work areas, as well as by passengers in the passenger area. Usually such monitors are fixedly mounted in the interior structure of the aircraft and therefore suffer from the drawback of not being adjustable for individual viewers. In other words, these prior art systems are not ergonomically correct for a wide variety of users.

With respect to the mounting of monitors in the aircraft-passenger area, U.S. Pat. No. 4,647,980 to Steventon et al. proposes a relatively complicated system of mounting television receiver modules in the back of an aircraft passenger seat, such as within the headrest portion of the seat, with the television screen facing backward for viewing by a passenger sitting in the seat immediately behind such headrest. Steventon et al. note that the television screen can be angularly oriented within the chassis at a selected tilt angle which is generally complimentary to the average reclined angle of such passenger seats. Problems with the proposal in Steventon et al. include that the television receiver modules are mounted in a preset, fixed position without allowing for adjustment by individual passengers. In addition, while the receiver modules are removable, the removing procedure is somewhat complicated by multiple plugs, thereby requiring a two-handed mounting operation.

Similar to the limitations of the mounting system in Steventon et al., U.S. Pat. No. 4,982,996 to Vottero-Fin et al. discloses an automotive seating system that includes an armrest of a front seat with an open back end in which is placed a television set. The television screen is viewable by passengers seated in a backseat when the armrest is swung to an operating position that makes the armrest's back end visible to such passengers. The television set is fixedly attached in the armrest and associated mounting members do not allow for selective adjustment of it for improved viewing.

In addition to their drawbacks from an ergonomic point of view, prior art mounting systems like those disclosed in Steventon et al. and Vottero-Fin et al. also fail to provide for multiple positioning of a monitor within a viewing area. These conventional systems are fixedly attached to a specific port and are not easily withdrawn from one port for placement in another.

In settings like the above-mentioned aircraft-passenger area it is desirable to have monitor mounting systems designed so that a given monitor may be plugged into any one of multiple ports located within the passenger area. By using such a mounting system with the recently developed, relatively small flat-screen televisions, airline companies could offer customers an optional, individual television service. Suitable ports could be installed adjacent each passenger seat and airline employees could hand out such televisions with corresponding mounting systems to customers on a fee basis. Such a television service could be provided in the same way that airlines presently offer audio service by handing out headphones to customers who can use them by inserting them in a jack provided in their seat.

It is therefore an object of the present invention to provide a monitor-mounting device that connects a monitor to an electronic-signal source and can be adjusted so that the user may position selectively the monitor for ergonomically correct viewing.

Yet another object of the present invention is to provide such a device that enables one-handed connecting of the monitor to the electronic-signal source and provides for mounting of the monitor adjacent an electronic-signal port.

A further object is to provide such a device that is easily connectable to multiple ports so that a monitor placed on such device may be used interchangeably in any one of the ports.

It is also an object of the invention to provide such a device that can be easily and cost-effectively manufactured.

A still further object is to provide such a device that is easily convertible for mounting on either the right or left side of a user.

SUMMARY OF THE INVENTION

The invention achieves the above objects by providing an articulable projecting plug that makes a mechanical connection between an electronic signal port and housing/support structure associated with an electronic device, and accommodates electronic communication between a signal source and such device by establishing contact between a first end of a conductor that is connectable with such a device and such port. The plug includes a joining member structured to bring the plug into contact with the port and hold them both in such joined relationship. The joining member includes an outer surface and holder structure for holding the first end of such elongate conductor structure so that joinder of the plug with the port will also result in contact between such first end and the port.

The plug also includes an elongate projecting member terminating with first and second ends, with the first end being operatively connected to the joining member so that the projecting member extends from it and away from the port. A pivot is provided so that the elongate projecting member is articulable in a pivot plane. The projecting member also includes a connector located adjacent its second end for fastening to such housing/support structure of the electronic device.

In a preferred embodiment the plug includes a receptacle mounted adjacent the port for receiving the joining member. The receptacle also includes a locking mechanism allowing for one-handed connection of the joining member with the receptacle. The pivot is disposed between the joining member and the elongate projecting member.

These and additional objects and advantages of the present invention will be more readily understood after a consideration of the drawings and the detailed description of the preferred embodiment.

BRIEF DESCRIPTION OF THE DRAWINGS

FIG. 1 is an isometric view of the invention in a partially open, articulated position holding a flat-screen television, and in an unjoined position with the receptacle which is located in the arm of an aircraft seat.

FIG. 2 is like FIG. 1 except that the invention has been pivoted in the pivot plane to a closed position, and is joined with the receptacle.

FIG. 5A is a side sectional view along line 5—5 of FIGS. 3 and 4 showing portions of the locking mechanism with the mechanism in a locked position.

FIG. 5B is like FIG. 5A except that the locking mechanism is in an unlocked position.

FIG. 6A is a side sectional view along line 6—6 of FIGS. 3 and 4 showing the joining member in the receptacle with the locking mechanism in a locked position.

FIG. 6B is like FIG. 6A except that the locking mechanism is in an unlocked position and the joining member is being removed from the receptacle.

DETAILED DESCRIPTION OF THE PREFERRED EMBODIMENT

Figure 3:
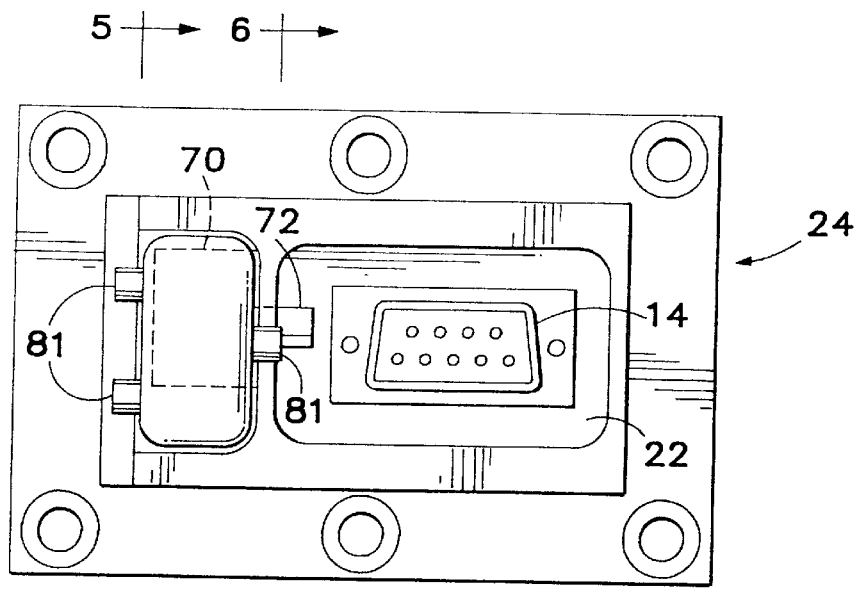
FIG. 3 is a top view of the receptacle showing the video-signal port and the locking mechanism.

Referring now to the drawings, FIGS. 1 and 2 show the articulable projecting plug of the present invention at 10 for holding a monitor such as a flat-screen television, a fragmentary section of which is shown by dashed lines 11. The term monitor is meant to refer to any display for an electronic or avionic device which is capable of displaying audio/visual or visual information. Plug 10 includes joining structure 12 constructed to bring the plug into contact with an electronic/video port such as jack 14 (FIG. 3) and hold them both in a joined relationship like that shown at 16 in FIG. 2.

Still referring to FIGS. 1 and 2, joining structure 12 includes an outer surface 18 in which a recess 20 is formed for use in connection with a to-be-described locking mechanism for holding releasably joining structure 12 in a space 22 defined by a receptacle 24. For future reference, the reader should note that joining structure 12 includes sloping edge 12a and curved edge 12b, the significance of which will become apparent after referring to the description of the locking mechanism provided below. As shown in FIGS. 1 and 2, receptacle 24 is placed in an open hole of an arm 26 of an aircraft seat (undepicted). Receptacle 24 is operatively connected to a frame member 26a.

Preferably, the receptacle is fixedly positioned so that it is flush with the top surface of arm 26 and it may be covered with a suitable hinged cover (undepicted). It should be understood that receptacle 24 could be positioned in any interior wall or other structure adjacent the viewing area, and could be pivotably mounted to the structure.

Referring to FIGS. 1–3 and 6A–6B, joining structure 12 includes a lead end 28 which is joinable with jack 14 and encloses a first end 32a (FIGS. 6A–6B) of conductor 32. Joining structure 12 also includes holder structure 34 for holding first end 32a so that joinder of plug 10 with jack 14 by placing it into space 22 of receptacle 24 will result in contact between first end 32a and jack 14.

Referring to the left of joining structure 12 in FIG. 1, plug 10 also includes elongate projecting structure 36 with first and second ends 38a, b. First end 38a is pivotedly connected to joining structure 12 using suitable means. For example, end 38a may be formed with arcuate arms 40a, b which are fittable around a bearing 42 which is rotatably positioned in the end of joining structure 12 that is opposite lead end 28. Arms 40a, b may be tightened around bearing 42 by actuating a fastener such as turning an allen screw 43 (FIGS. 6A–6B) which is positioned in a hole 44 formed in arm 40a and extendable into a threaded bore (undepicted) formed in arm 40b.

Still referring to FIG. 1, projecting structure 36 is articulable bidirectionally, as shown by arrows at 46, preferably in a pivot plane that is substantially normal to the long axis joining structure 12. It should be understood that modifications to the pivotable connection between the airplane, receptacle 24, projecting structure 36 and joining structure 12 would make it possible to select a variety of pivot planes and it is by no means a requirement of the invention that the pivot plane be substantially normal to the long axis of joining structure 12, nor that joining structure 12 pivot relative to projecting structure 36.

Referring to the left side of projecting structure 36 in FIG. 1, second end 38b is provided with a connector such as a bearing 48 which is rotatably positionable in it. The top of bearing 48 is rotatably positionable in a suitable hole formed in housing/support structure 50. Housing/support structure 50 may be thought of as being part of projecting structure 36 so that projecting structure 36 could be said to include a first elongate projecting member 52 and a second elongate projecting member 54. Second projecting member 54 includes a connector for attaching to upright support structure 56 and such a connector may take the form of one or more screws, two of which are shown at 58 in FIG. 1.

Still referring to FIGS. 1 and 2, upright support structure 56 is preferably formed with two upright arms 60a, b and a tilt bracket 62 opposite ends of which are pivotably attached to the upright arms using suitable means such as bearings, one of which is shown at 64. The bearings are attachable to bracket 62 using suitable fasteners such as screws 66, and are attachable to arms 60a, b using fasteners such as allen screw 67 (FIG. 2).

FIGS. 1 and 2 show an embodiment of the present invention that is designed for mounting on the right side of a user. However, it should be understood that plug 10 could be easily converted for left-side mounting by simply detaching bracket 62 from arms 60a, b, turning it 180°, and reattaching it to the arms.

Still referring to FIG. 1, tilt bracket 62 is pivotable selectively in a plane different from the pivot plane to allow the user to selectively adjust, or tilt, the monitor for improved, preferably ergonomically correct viewing.

Referring back to FIG. 1, preferably conductor 32 is positionable inside plug 10 with first end 32a held by holder structure 34 and its second end 32b projecting out of projecting structure 36 for connection to television 11. (In FIG. 2, second end 32b is shown oriented generally for such connection, with end 32b being freely movable to make such connection with television 11 (not shown in FIG. 2), as between bracket 62 and member 54). Such positioning is made possible by forming an open channel in both joining structure 12 (see conductor 32 placed in such channel in FIGS. 6A–6B) and in projecting structure 36 (see conductor 32 in such channel in FIG. 1 and exiting such channel in FIG. 2).

Referring now to FIGS. 3–6B, a locking mechanism for releasably locking joining structure 12 in receptacle 24 will now be discussed. The preferred locking mechanism is shown generally at 68 and includes a laterally disposed bar 70 that is formed with a protrusion 72 which extends into space 22. Referring to FIGS. 5A–5B, bar 70 is positionable in an open section 74 formed in receptacle 24. Bar 70 is also formed with an opening 76 for receiving a wedge 78 that extends downwardly from, and is attached to, a pushbutton 80. As perhaps best shown in FIG. 3, push-button 80 is fitted with three vertical-aligner pins 81 that extend laterally into vertical tracks, two of which are shown by dashed lines 82 in FIG. 1, formed in receptacle 24. The pins are received in the tracks to ensure that the pushbutton will move only vertically.

Figure 4:
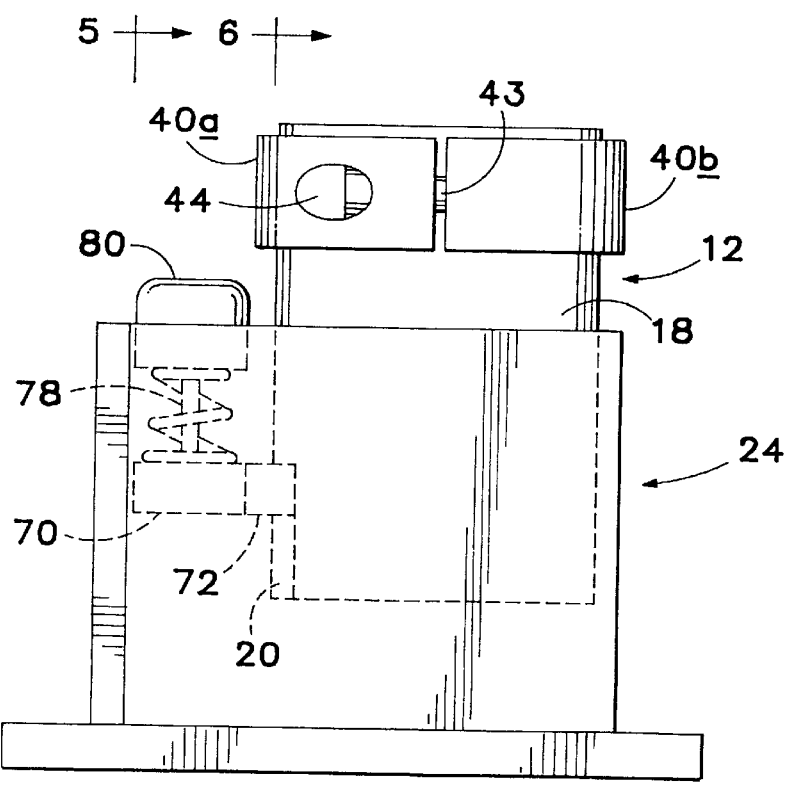
FIG. 4 is a side elevational view of the receptacle.

The reader can understand the locking mechanism by first viewing protrusion 72 extending into space 22 as shown in FIGS. 3–4, and then viewing recess 20 in outer surface 18 of joining structure 12 as shown in FIG. 1. Next, referring to FIG. 6A, there is shown protrusion 72 in a first position blocking upward movement of joining structure 12. Protrusion 72 is movable to this first position by inserting joining structure 12 into receptacle 24 with sloping edge 12a glidably moving along angled surface 72a. Because bar 70 (and thus protrusion 72) is spring-loaded with respect to horizontal movement in open section 74 of receptacle 24, downward movement of joining member 12 will cause gliding movement between sloping edge 12a and angled edge 72a. Such gliding movement will cause bar 70 to move laterally against spring-loaded tension until joining structure 12 is inserted completely into space 22. At this point, which is depicted in FIG. 6A, sloping edge 12a will be positioned below angled surface 72a, which allows protrusion 72 (and bar 70) to spring laterally into curved edge 12b. With protrusion 72 movable to the first position shown in FIG. 6A, joining structure 12 is locked in receptacle 24 because the protrusion prevents upward movement of the joining structure out of the receptacle.

Referring to FIGS. 5B–6B, it will be understood that the locking mechanism may be unlocked by pushing down on pushbutton 80. When pushbutton 80 is pushed down, wedge 78 will force bar 70 to move laterally such as to the right in open section 74 as shown in FIG. 5B. Referring to FIG. 6B, such movement of bar 70 will cause protrusion 72 to move to the right in the direction of arrow 88, thereby allowing joining structure 12 to be moved upwardly in the direction of arrow 90. Such upward movement is possible because protrusion 72 will no longer be in the first position shown in FIG. 6A, but will instead be in the second position shown in FIG. 6B where it is out of blocking position with curved edge 12b of joining structure 12.

OPERATION

From the above description, and referring to FIG. 1, it should be apparent that articulable projecting plug 10 of the present invention is usable to make a mechanical connection between an electronic-signal port such as jack 14 and housing/support structure 50 which is associated with an electronic/avionic device such as television 11. Plug 10 also accommodates electronic communication between a signal source (undepicted) and television 11 by establishing contact between first end 32a of conductor 32 and jack 14, with conductor 32 being connectable via its second end 32b to television 11.

Still referring to FIG. 1, once mechanical connection is made and electronic communication exists between the source and television 11, plug 10 is articulable in the direction of arrows 46 in a pivot plane. The user can also move television 11 in a plane that is different from the pivot plane by moving tilt bracket 62 in the direction of arrows 92 in FIGS. 1 and 2.

Referring to FIGS. 1–2 and 5A–6A, the user locks plug 10 in receptacle 24 by inserting joining structure 12 into space 22. Referring to FIG. 6A, such movement causes protrusion 72 of bar 70 (FIG. 5A) to move to a first position blocking upward movement of sloping edge 12a thus blocking upward movement of joining structure 12.

Referring to FIGS. 5B and 6B, the user unlocks plug 10 from receptacle 24 by pushing downwardly on pushbutton 80 which causes wedge 78 to move downwardly, thereby moving bar 70 laterally against spring-loaded tension. Such movement of bar 70 causes protrusion 72 to move to a second position shown in FIG. 6B. The second position is out of blocking engagement with sloping edge 12a, with the result being that joining member 12 can be moved upwardly and out of receptacle 24 in the direction of arrow 90.

It should be appreciated that receptacles like receptacle 24 could be placed in desired arms of aircraft-passenger seats (like arm 26) and plug 10 could be easily interchangeably mounted in any one of such receptacles to establish communication with an associated signal port (like jack 14). In this way, plug 10 could be used by airline companies to offer individual television service to customers.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. An articulable projecting plug comprising:
   elongate projecting structure having first and second ends, the second end of the projecting structure being pivotally connected to a housing/support structure for supporting an electronic device;
   a mechanical connector arrangement including joining structure and a tubular receptacle, the joining structure being pivotally mounted on the first end of the projecting structure and having a protruding exterior which mates with a hollow interior of the receptacle to provide structural support for the projecting structure; and
   an electrical connector arrangement including a first part operatively connected to the receptacle and a second part operatively connected to the joining structure such that mating of the joining structure and the receptacle of the mechanical connector arrangement effects mating of the first and second parts of the electrical connector arrangement.

2. The plug of claim 1, wherein the first part of the electrical connector arrangement is disposed within the hollow interior of the receptacle and the second part of the electrical connector is disposed on the protruding exterior of the joining structure.

3. Articulable support/connection apparatus operable by a user for supporting a monitor and accommodating video communication between a video-signal source and such monitor, the apparatus comprising:
   a tubular receptacle having a video-signal port positioned therein, the video-signal port being configured for connection to the video signal source;
   elongate conductor structure having first and second ends, the first end of the conductor structure being configured for connection with the video-signal port and the second end of the conductor structure being configured for connection with the monitor;
   elongate projecting structure having first and second ends, the second end of the projecting structure being configured for pivotal connection to the monitor and to support the monitor;
   joining structure including a protruding exterior connected to the first end of the projecting structure and configured for mating releasable joining with the receptacle to establish mechanical support for the projecting structure, the joining structure including holder structure for holding the first end of such elongate conductor structure fixed relative to the joining structure so that joinder of the joining structure with the receptacle will result in electrical contact between the first end of the conductor structure and the video-signal port; and
   a pivot operatively connected to the projecting structure and adapted to interpose the joining structure and the projecting structure such that the projecting structure is articulable in a pivot plane to allow relative positioning between the monitor and the user.

4. The apparatus of claim 3, wherein the joining structure and projecting structure are each formed with an open channel, the channels being aligned to provide a passage for the conductor structure through the apparatus with the conductor structure being positionable within the open channel with the first end of the conductor structure in the holder structure of the joining structure, and the second end of the conductor structure configured for connection to the monitor.

5. The apparatus of claim 3, wherein the receptacle defines a hollow interior for receiving the joining structure and includes a locking mechanism for releasably maintaining the joining structure within the receptacle.

6. The apparatus of claim 5, wherein the joining structure has an outer surface with a recess formed therein and the locking mechanism includes a protrusion which is movable between a first position in mating attachment with the recess for locking the joining structure in the receptacle and a second position out of mating attachment with the joining structure to unlock the joining structure and the receptacle.

7. The apparatus of claim 6, wherein the protrusion is biased toward the first position.

8. The apparatus of claim 7, wherein the locking mechanism further includes a push-button having an associated wedge, the push-button being configured to effect operative engagement between the wedge and the protrusion to effect passage of the protrusion into the second position.

9. An articulable projecting plug assembly for supporting an electronic device, and accommodating electronic communication between a signal source and such device, the assembly comprising:
   an elongate conductor having first and second ends, the second end of the conductor being connectable to the electronic device;
   a tubular receptacle having an electronic signal port enclosed thereby;
   joining structure including an elongate generally tubular protruding exterior with a lead end configured to join matingly with the tubular receptacle and an outer surface configured to hold the joining structure and receptacle in such joined, placed relationship to establish a load-bearing structural support for the electronic device, and including a holder configured to hold the first end of the elongate conductor so that joinder of the joining structure and the receptacle also will result in electrical connection between the first end of the conductor and the electronic signal port which is enclosed by the receptacle; and
   elongate projection structure terminating with first and second ends, the first end of the projection structure being pivotally connected to the joining structure so that the projection structure extends from the joining structure, and is articulable in a pivot plane to allow relative positioning between the electronic device and the user, and where the projection structure includes a connector located adjacent its second end for fastening to the electronic device.

10. The plug assembly of claim 9 wherein the joining structure is structured to enclose the first end of the conductor.

11. The plug assembly of claim 9 wherein the joining structure and projection structure are each formed with an open channel extending along their length, and wherein the channels are aligned to provide a passage for the conductor through the plug assembly, the conductor being positionable inside the plug assembly with its first end in the holder of the joining structure, and its second end projecting out of the projection structure for connection to the electronic device.

12. The plug assembly of claim 9 wherein the projection structure includes a first elongate projecting member pivotally connected to the joining structure.

13. The plug assembly of claim 12 wherein the projection structure includes a second elongate projecting member pivotally connected to the first elongate projecting member and including a connector for fastening to the housing/support.

* * * * *